United States Patent Office 3,725,199
Patented Apr. 3, 1973

3,725,199
NUCLEAR REACTOR ORGANIZATION AND FUEL
ASSEMBLY ARRANGEMENT
Gennaro V. Notari, Simsbury, and Royce J. Rickert, Bloomfield, Conn., assignors to Combustion Engineering, Inc., Windsor, Conn.
Continuation of application Ser. No. 631,090, Apr. 14, 1967. This application Apr. 9, 1969, Ser. No. 817,255
Int. Cl. G21c 15/22, 3/32, 3/14
U.S. Cl. 176—61
8 Claims

ABSTRACT OF THE DISCLOSURE

A fuel assembly for a nuclear reactor cooled by a moderating fluid. The assembly has flow tubes that extend beyond the inlet of the assembly and provide positioning and support structure when the assembly is mounted in the reactor. Flow is regulated through the flow tubes by orifices upstream of these tubes.

This application is a continuation of application Ser. No. 631,090, filed Apr. 14, 1967.

BACKGROUND OF THE INVENTION

The thermal margin within a reactor cooled by a moderating fluid, such as water cooled reactors, may be improved by introducing relatively cool water into regions of the reactor core having a high rate of enthalpy rise or in other words a high power density. This may be accomplished as disclosed in the U.S. application Ser. No. 630,986 of Paul C. Zmola and Royce J. Rickert filed Apr. 14, 1967 under the title of "Nuclear Reactor Arrangement and Method of Operating Same Effective to Increase the Thermal Margin in High Power Density Regions" by providing flow tubes within the reactor core in a generally uniform distribution with each assembly having a plurality of these tubes and with the tubes occupying an area that would normally be occupied by a plurality of fuel tubes. These flow tubes extend beyond the entrance or lower region of the assembly and receive coolant-moderator entering the reactor core preferably at a region upstream of the support plate for the core. These tubes have openings so as to distribute this moderator interiorly of the core with the initial holes being spaced well from the lower end of the assembly. Thus this fluid, in effect, bypasses the initial core region, and accordingly upon being introduced into the interior of the core lowers the enthalpy in the region of its introduction.

BRIEF DESCRIPTION

The tubes disposed in the assembly for thus conveying the coolant-moderator also act as fastening means and support mechanism for the assembly in accordance with the present invention. The tubes are secured to the end fittings of the assembly and thus retain the assembly together. They also extend below the lower end fitting so as to be received in complementary openings provided in the core support plate. One of the tubes is substantially longer than the others so as to act as a centering or positioning member, and the remaining tubes are provided with flanges which engage the support plate so that these tubes act as support members or feet for the assembly. The openings in the support plate have orifice members removably associated therewithin in order to regulate the flow through the tubes as desired.

Figure 1:
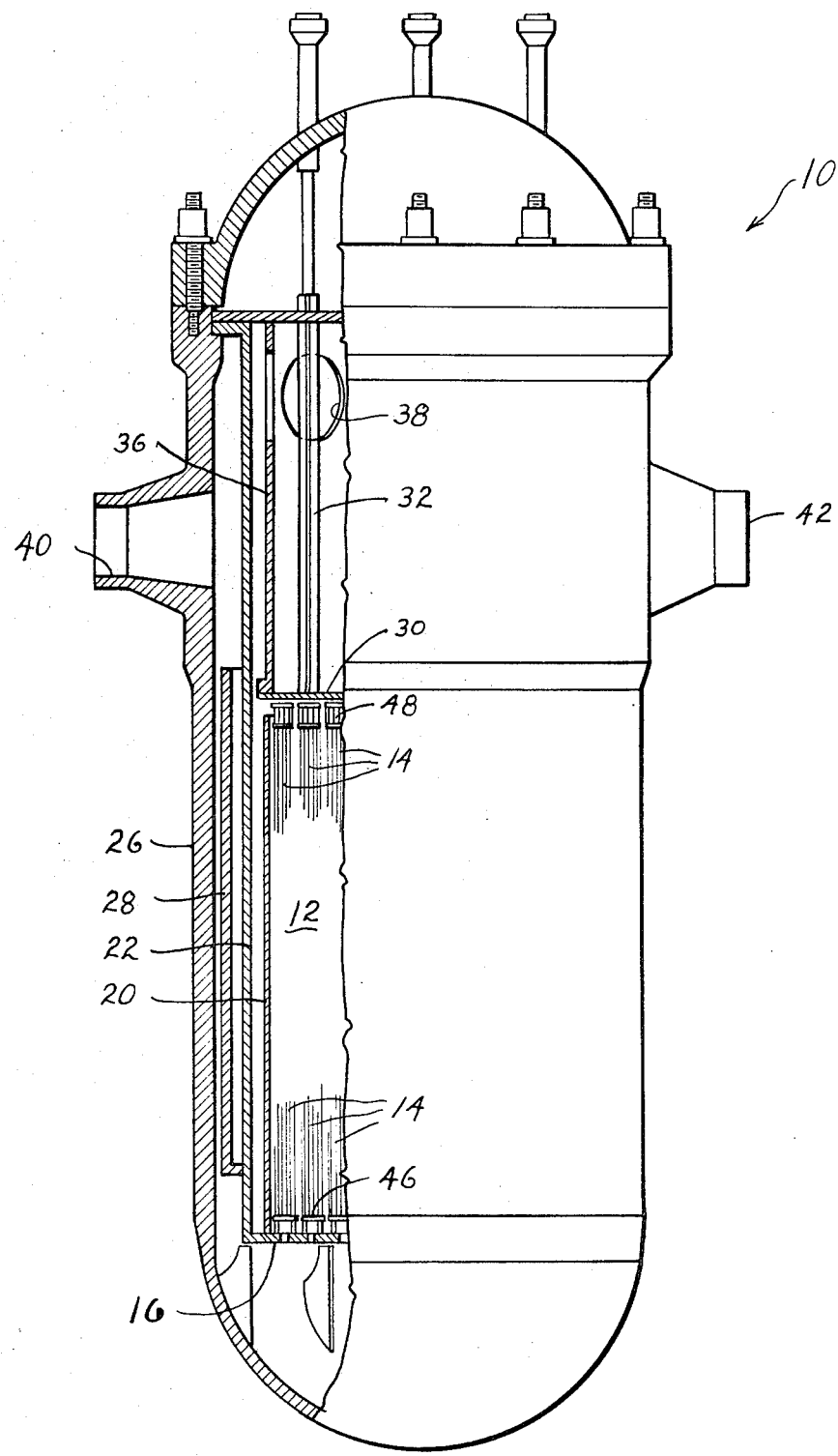
FIG. 1 is in the nature of an elevational view of a reactor embodying the present invention with this view being partially broken away in order to show the construction of the reactor interior.
Figure 2:
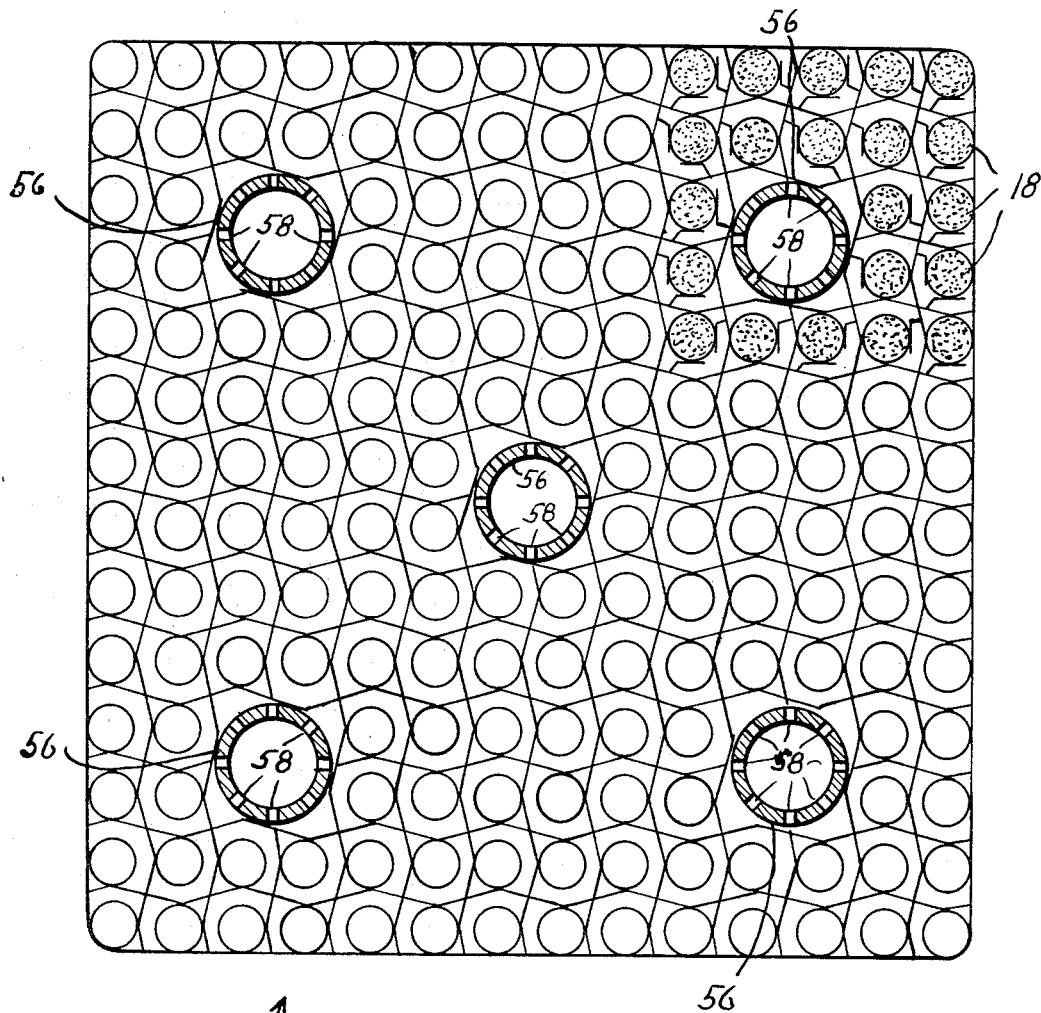
FIG. 2 is in the nature of a sectional view through one of the fuel assemblies of the invention.

Referring now to the drawings wherein like reefrence characters are used throughout to designate like elements, the illustrative and preferred embodiment of the invention depicted therein includes a nuclear reactor identified generally as 10 and which comprises the vessel 26 having disposed therewithin the core 12. This core rests upon the support plate 16 secured to the lower end of barrel 22. Shielding is provided by shield member 28 and a holddown plate 30 is secured to the lower end of the skirt 36. Flow of the moderator-coolant through the reactor is via th enozzle 40 down around barrel 22 and thence up through the core within shroud 20 and out the openings 38 and nozzle 42. The reactor is regulated by the adjustable control rods 32.

The core of the reactor is comprised of a relatively large number (as for example 217) of fuel assemblies 14. Each of these assemblies has numerous parallel fuel tubes 18 and these tubes may be of zirconium filled with a fissionable material such as uranium carbide or uranium oxide. These tubes are secured between end fittings 46 and 48 which may take any desired form such as that disclosed in the aforementioned copending application. Throughout the length of the assembly numerous grids may be provided to retain the desired alignment and prevent vibration. The end fittings as well as the grids and support plate 16 are constructed to permit the passage of the moderator-coolant therethrough and thus up through the core and over the fuel elements to remove heat generated therewithin during operation of the reactor.

Figure 3:
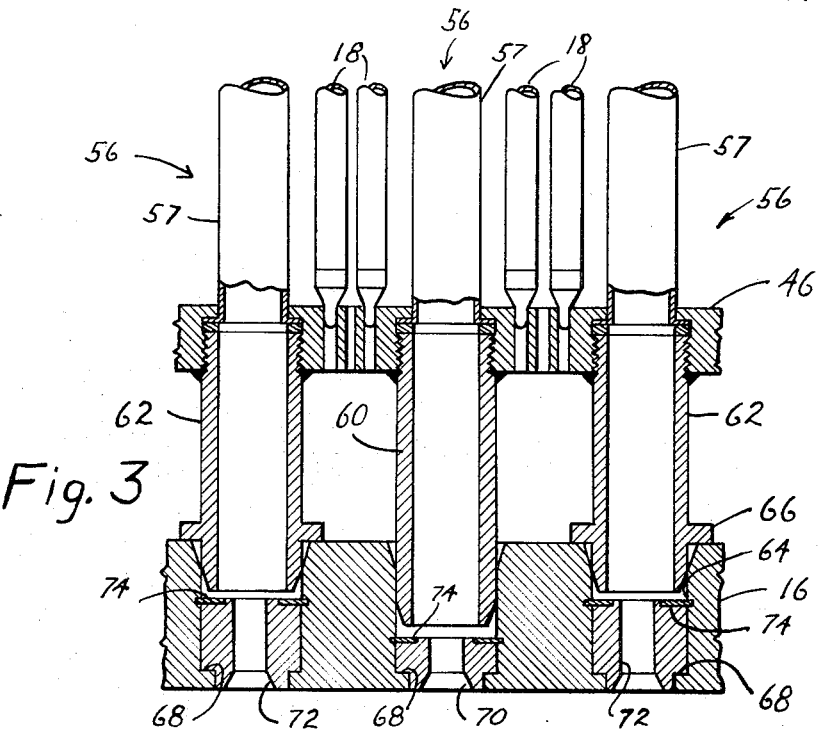
FIG. 3 is a fragmentary vertical section through the lower region of the assembly with this view being taken generally along line 3—3 of FIG. 2.

Interspersed in each of the fuel assemblies are a plurality of flow tubes 56 which have the purpose described in the previously identified co-pending application of Zmola and Rickert. These tubes may advantageously be disposed in the array disclosed in FIG. 3, and they have an upper portion 57 that extends from the upper end fitting 48 downward to the lower support member or plate 46 being connected with each so as to retain them in their desired position and thus hold the assembly together. The flow tubes 56 are provided with openings 58 which may start at a location about ⅓ or ½ way up the tube and continue for a substantial distance so that the fluid is introduced well up into the reactor core and bypasses the lower region of the core thereby reducing the enthalpy of the coolant in high enthalpy regions.

The assembly is guided and supported by lower extensions of the tubes 56. These extensions are identified in FIG. 3 as 60 and 62. There are four of the extensions 62 forming part of the outermost tubes 56 while the extension 60 forms part of the innermost tube 56. Each of the extensions is provided with a tapered outer surface at its lower end and is received within an opening 64 provided in support plate 16. These openings are likewise chamfered to provide for ease of positioning the fuel assembly with respect to these openings. The extension 60 is longer than the extension 62 such that when the fuel assembly is lowered into the reactor core, this center extension will act as an initial position guide with this extension being first received in its corresponding opening 64. Upon further lowering of the assembly after extension 60 is initially received in its openings, the extensions 62 will be received in their corresponding openings when the assembly is in the correst orientation. Extensions 62 thus act as locating members. Each of the extensions 62 is provided with a flange 66 which (in the FIG. 3 embodiment) rests against the upper surface of the support plate 16 when the assembly is lowered into position and thus the extensions 62 form legs upon which the fuel assembly 14 rests.

In order to regulate the flow through the tubes 56 there is provided within at least some of the openings 64 a suitable orifice. The openings have formed therein shoulders 68 engaged by complementary shoulders on orifice plates 70 and 72. These orifice plates are retained in position by the snap rings 74 received in complementary grooves provided in the openings 64. The size of the orifices in the orifice plates associated with tubes 56 in different regions of the core may vary as desired in order to provide the most desirable operating conditions within the core of the reactor, and this orifice plate may be eliminated in some regions to provide the greatest possible flow.

Figure 4:
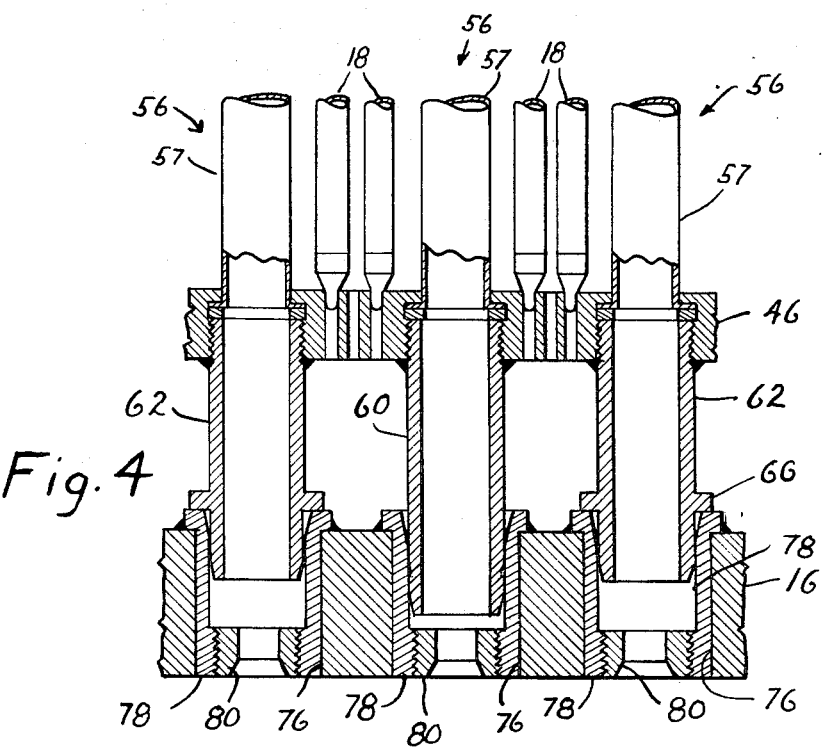
FIG. 4 is a sectional view similar to that of FIG. 3 but showing a modified form of construction.

The embodiment of FIG. 4 provides a modification of the mounting for the orifice plates, with this embodiment being somewhat simpler to construct in that the machining operations required to be performed upon the support plate 16 are substantially reduced. It will be appreciated that this support plate is relatively large being several feet in diameter and of necessity must be extremely accurate, being ground to high tolerances. In the FIG. 4 modification support plate 16 is provided with bores 76 within which are received the flanged sleeves 78. There is one such sleeve for each of the extensions 60 and 62. These sleeves are chamfered at their upper end as shown and the flanges of the sleeves rest upon the upper surface of the support plate 16. The sleeves may be tack-welded in place, and the sleeves associated with extensions 62 are engaged by the flanges 66 of these extensions. Threaded into the lower end of the sleeves is the orifice plate 80 which may also be tack-welded in place.

The extensions 60 and 62 are threaded into the lower end fitting 46 of the assembly. A radially outwardly directed shoulder is provided on the lower end of the upper portion 57 of the tube 56, and this shoulder rests upon a complementary shoulder 82 provided in fitting 46. A washer 86 is interposed between the upper end of extensions 60 and 62 and the flange on the lower end of the upper tube portion 57. Through this arrangement this upper tube portion is secured to the fitting 46.

The arrangement of the invention provides an improved assembly which is economic in construction and satisfactory in operation providing for an introduction of cooling fluid into the core interior and providing for a regulation of this fluid in accordance with desired conditions and parameters of the reactor.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. In a fluid cooled and moderated nuclear reactor the combination of a lower support plate for supporting a plurality of substantially parallel fuel assemblies of a reactor core in a vessel, each of the assemblies of the core having numerous vertically disposed fuel elements retained in a particular array and a plurality of flow tubes secured to and extending up into the assembly in parallel relation with said elements wherein each flow tube has an opening in the bottom end thereof, said flow tubes effectively extending through and below the lower end of each assembly, said support plate having a plurality of individual complementary openings therethrough and each of said flow tubes received within one of said individual complementary openings provided in said support plate, at least some of said tubes having means engaging said support plate by which each of said assemblies is supported on said support plate with said lower end of each assembly being spaced upwardly therefrom, said tubes having openings in the wall thereof at a location spaced well above the bottom ends thereof, and means directing the fluid coolant moderator up through said support plate and then through said flow tubes and said flow tube wall openings.

2. The organization of claim 1 including removable orifice means disposed in some of said individual complementary openings in said plate within which said tubes are received.

3. The organization of claim 1 wherein there are provided in each of said individual complementary openings in the support plate sleeves which have flanges at their upper end to engage the plate with the sleeves effectively forming a portion of the plate, each of said sleeves receiving the lower extremity of one of said tubes.

4. A water cooled nuclear reactor including a core supported on a lower support plate, said support plate being mounted in a vessel, said core comprising a plurality of substantially parallel fuel assemblies each of which includes a plurality of vertically extending fuel tubes retained in a particular array, a plurality of fluid distributing tubes rigidly disposed within each assembly and extending beyond the lower end of each assembly wherein each tube has an opening in the bottom end thereof, said support plate having a plurality of individual complementary openings therethrough, and the lower extremities of each of said flow distributing tubes received within one of said individual complementary openings provided in said support plate, at least some of said distributing tubes engaging said lower support plate to effectively support each of said assemblies above and spaced apart from said plate, there being a sufficient number of such distributing tubes in each assembly thus engaging the plate to provide a stable support, said distributing tubes having openings starting at a location spaced well from the lower end of the assembly and disposed in the walls thereof to introduce fluid laterally into the assembly, and means directing water up through the openings in said support plate and through said tubes and tube openings.

5. The organization of claim 4 wherein there are five distributing tubes provided in each assembly with one of said tubes disposed centrally with relation to the outer four, and wherein the outer four tubes engage the support plate to effectively support the assembly therefrom.

6. The organization of claim 4 wherein orifice means are provided within at least some of the openings with which the distributing tubes communicate so as to regulate the flow as desired.

7. The organization of claim 5 wherein said outer four distributing tubes are provided with flanges for supporting the assembly.

8. The organization of claim 5 wherein the centermost distributing tube extends downwardly beyond the outer four flow tubes to act as a positioning means in installing the assembly into the core.

(References on following page)

References Cited

UNITED STATES PATENTS

| | | | |
|---|---|---|---|
| 3,322,643 | 5/1967 | Sprague et al. | 176—42 |
| 3,354,045 | 11/1967 | Macfall et al. | 176—78 |
| 3,366,546 | 1/1968 | Anthony et al. | 176—78 |
| 3,368,946 | 2/1968 | Jenssen | 176—76 |
| 3,379,619 | 4/1968 | Andrews et al. | 176—61 |
| 3,390,052 | 6/1968 | McDaniels, Jr. | 176—35 |
| 3,398,050 | 8/1968 | Yevick et al. | 176—50 |
| 3,425,904 | 2/1969 | Bogaardt | 176—54 |
| 3,401,081 | 9/1968 | Menzel et al. | 176—50 |
| 3,346,459 | 10/1967 | Prince et al. | 176—36 |
| 3,361,639 | 1/1968 | Ashcroft et al. | 176—68 |
| 3,070,537 | 12/1962 | Treshow | 176—61 X |

FOREIGN PATENTS

| | | | |
|---|---|---|---|
| 1,012,433 | 12/1965 | Great Britain | 176—50 |
| 1,067,551 | 5/1961 | Great Britain | 176—50 |
| 1,254,427 | 1/1960 | France | 176—61 |

CARL D. QUARFORTH, Primary Examiner

R. GAITHER, Assistant Examiner

U.S. Cl. X.R.

176—35, 50, 56, 59, 64, 78, 87